United States Patent [19]

Bernett et al.

[11] Patent Number: 4,821,130
[45] Date of Patent: Apr. 11, 1989

[54] DISK EXTENDER BAFFLES

[75] Inventors: Frank Bernett; Tave Fruge, both of Colorado Springs, Colo.

[73] Assignee: Digital Equipment Corporation, Maynard, Mass.

[21] Appl. No.: 93,195

[22] Filed: Sep. 4, 1987

[51] Int. Cl.$^4$ .............................................. G11B 17/32
[52] U.S. Cl. .................... 360/78.04; 360/98.07; 360/103; 360/106
[58] Field of Search .................. 360/98, 102, 103, 97, 360/99, 106, 105

[56] References Cited

U.S. PATENT DOCUMENTS

| | | | |
|---|---|---|---|
| 3,618,055 | 11/1971 | Van Acker et al. | 360/98 X |
| 4,250,528 | 2/1981 | Oda | 360/98 |
| 4,660,110 | 4/1987 | Iida et al. | 360/98 |
| 4,703,379 | 10/1987 | Bogdanski | 360/103 X |

FOREIGN PATENT DOCUMENTS

| | | | |
|---|---|---|---|
| 54-154310 | 12/1979 | Japan | 360/98 |
| 56-137559 | 10/1981 | Japan | 360/98 |
| 59-94273 | 5/1984 | Japan | 360/103 |
| 60-136980 | 7/1985 | Japan | 360/103 |
| 61-216175 | 9/1986 | Japan | 360/98 |

Primary Examiner—John H. Wolff
Assistant Examiner—Matthew J. Bussan
Attorney, Agent, or Firm—Kenyon & Kenyon

[57] ABSTRACT

A baffle assembly comprises a series of parallel baffle plates positioned adjacent to and coplanar with the respective disks mounted on a spindle of a disk drive. The baffle plates help maintain parallel air flow across each disk edge thereby reducing turbulence at the disk edge. This reduces the vertical vibratory motion of the positioning arm holding the transducer head slider suspension assembly which in turn reduces the horizontal or cross-track motion of the head.

11 Claims, 5 Drawing Sheets

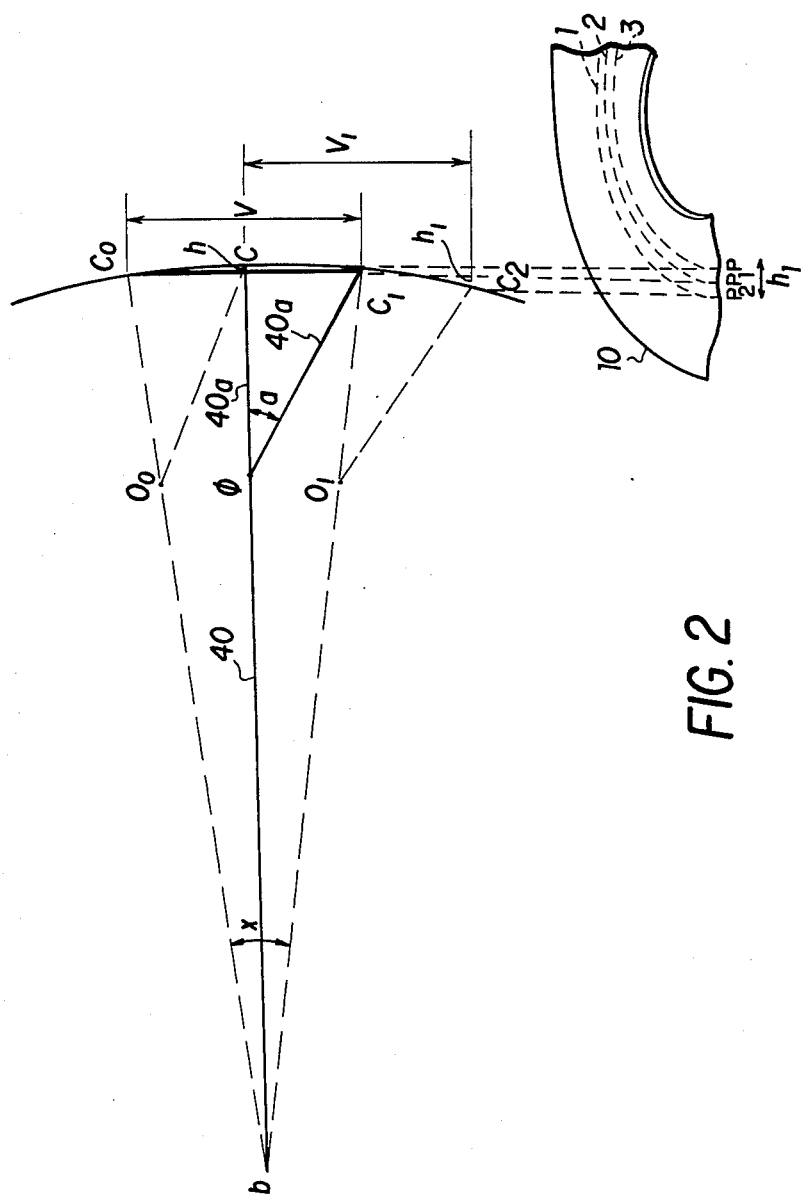

DISK EXTENDER BAFFLES

BACKGROUND OF THE INVENTION

This invention relates to disk drives in general and more particularly to a baffle assembly which reduces air turbulence at the outer disk edge of a disk drive thereby reducing the off-track error produced when positioning a head slider assembly over a magnetic disk for reading and writing information on concentric data tracks located thereon.

With the advent of magnetic disks having higher track densities, e.g., densities over 1500 tracks per radial inch (tpi) and positioning arms of decreased weight and therefore reduced stiffness, the problem of accurate positioning of the transducer head over a data track becomes more acute. Off-track errors on the order of 40 micro inches which were acceptable on prior low density disks are no longer tolerable for positioning a transducer head over a disk having a high track density.

In disk drives, it is common for the head slider assembly to be supported on a short suspension arm mounted on a positioning arm which is aligned with the horizontal. The suspension arm typically is mounted at a small angle with respect to the positioning arm. Applicants have discovered that air turbulence causes such a positioning arm, in particular, upon which a head slider assembly is mounted to undergo vibrations. These vibrations result in corresponding changes in horizontal head position thereby producing undesirable cross track motion of the head. At high track densities even a small change in the horizontal position of the transducer head (e.g., 40 micro inches) produces significant off-track errors.

The problem can best be seen with reference to FIGS. 1-2 of the drawings. FIG. 1 depicts an elevational end view of a disks 10 and 11 and positioning arms 40, 41 and 42. The disks 10 and 11 may be part of a plurality of disks mounted on a spindle (not shown) having a longitudinal axis shown in FIG. 1 at I—I. The disks 10, 11 are mounted in axially spaced horizontal planes which are perpendicular to the longitudinal axis of the spindle. The positioning arms 40, 41 and 42 are mounted in respective horizontal planes on a rotary actuator 30 (not shown in FIG. 1) having a longitudinal axis II—II. At the end of each positioning arm is a transducer head slider suspension assembly comprising a small suspension arm 40a, 41a, 41b and 42a (approximately 1 inch in length) upon which one or more heads, schematically shown at 50, 51, 52, and 53, are mounted. Each suspension arm is typically mounted at a small angle (e.g., 2°) with respect to its respective horizontal positioning arm 40, 41 and 42 such that the suspension arm, e.g., 40a, and transducer head, e.g., 50, lie in a plane that intersects the horizontal at angle a. Positioning arm 41 is mounted in the space between disks 10 and 11 and is provided with two angularly mounted head suspension assemblies (41a, 51 and 41b, 52). Head 51 is adapted to read and write information on the bottom surface 10b of disk 10 and head 52 is adapted to read and write information on the top surface 11a of disk 11 in a manner that is well known in the art. The disks and positioning arms are mounted within a sealed housing such as that shown at 4 in FIG. 1A.

It is common for the suspension assemblies to be arranged such that the heads initially lie on their respective disk surfaces. As is well known in the art, the disks are rotated about longitudinal axis I—I by a spindle motor and such rotation induces air flow over the disk. The air flow causes the head slider assemblies to aerodynamically fly over the surface of the disk. Rotation of the actuator moves the positioning arm and head suspension assembly over various concentric data tracks located on the disk for reading and writing data or servo information.

FIG. 2 is an enlarged geometrical representation of a suspension arm 40a showing how pivotal motion of positioning arm 40 through a given vertical distance produces horizontal motion causing undesirable cross track motion of the head and hence off-track error. FIG. 2 demonstrates that this effect is more pronounced, i.e., greater horizontal or cross track motion is produced, when using an angled suspension arm.

Line oc represents a greatly enlarged suspension arm 40a mounted at a 0° angle with respect to the positioning arm 40 (line bo) which is aligned with the horizontal. Vibration of positioning arm 40 results in pivotal movement of the arm about the point from which it is suspended (i.e., point b in FIG. 1) in the plane of the paper. A head mounted at point c will move along an arc when subjected to air turbulence. Assuming a given amount of angular deflection x, the head at point c will vibrate between positions indicated by dashed lines $bo_0c_o$ and $bo_1c_1$. Movement of the arm along the arc produces a corresponding change in both the vertical and horizontal positions of the head located at point c as indicated by v and h, respectively. When the arm 40a is mounted at a 0° angle with respect to positioning arm 40, the horizontal component h of the vibratory motion will be infinitesimal for a given angular deflection x.

However, as the angle at which the suspension arm is connected relative to the horizontal positioning arm increases either below (as shown in FIG. 2) or above the horizontal, the horizontal component of the pivotal vibratory motion increases to amounts which result in significant off-track error when positioning a head over a disk track.

For example, if the arm 40a is mounted at an angle a with respect to the positioning arm 40 as shown in FIG. 2 and undergoes the same amount of vibratory angular deflection x, the arm assembly 40, 40a will vibrate between positions $bo_0c$ and $bo_1c_2$. The resulting change in vertical position is $v_1$, and the change in horizontal position is hl which is much greater than h. For a positioning arm having a length of 3.75 inches, a suspension arm length of 1 inch and a suspension angle of 2° with respect to the positioning arm, a vibration producing a change in vertical position vl of 0.001 inches results in a change in horizontal position hl of approximately 40 micro inches. At high track densities such as those greater than 1500 tpi, 40 micro inches is a significant amount of cross track motion to cause intolerable off-track errors, i.e., the transducer head would not occupy the desired position for reading or writing information from a particular sector of a track.

As shown in FIG. 2, the head of suspended arm assembly 40, 40a (line $boc_1$) is located at point $c_1$, such that it is directly over data sector P1 of track 2 of the disk 10. Vibratory motion of the head between points c and $c_2$ causes movement of the head through the horizontal distance $h_1$. This results in inaccurate positioning as the head vibrates between data sector $P_2$ of track 1 and data sector P of track 3 instead of being located over the desired sector $P_1$ of track 2.

Experimentation has shown that the positioning arm may undergo vertical vibrations on the order of 275 Hz. The vibration amplitude decreases as the head assembly moves toward the center of rotation of the disk and increases at the outer disk edge. Applicants have discovered that air turbulence at the disk edge is the major cause of the vibration. At track densities greater than 1500 tpi, such vibration causes significant off-track motion. Whether this vibratory cross track motion actually causes the head to occupy positions between points on two different data tracks or between a point on the desired data track on another point located in between data tracks depends on the track density of the particular disk used. In either case inaccurate positioning results.

Inaccuracy of head positioning is also a problem at track densities less than 1500 tpi when positioning arms of reduced weight and hence, reduced stiffness, are employed.

SUMMARY OF THE INVENTION

The present invention solves the problem of offtrack head positioning errors induced by vibrations due to air turbulence by decreasing the turbulence at the outer circumferential edge of the disk. This is accomplished through the use of disk extender baffles which are closely spaced to the outer edge of the disk such that air at the edge of the disk sees the effect of a continuous flat surface and not open space. In this manner, air traveling parallel to the disk surface will continue to travel parallel as it passes over the disk edge and over the baffle. The air flow will remain relatively laminar rather than becoming turbulent as it leaves the surface of the disk. The baffle must have substantially the same thickness as the thickness of the disk and it must be mounted in the same horizontal plane as the disk, i.e., it must be coplanar with the disk. A clearance gap space between the baffle and the disk of 0.050 inches has been found sufficient to prevent turbulent air flow. To accommodate for the typical arrangement in which several disks are mounted in horizontal planes within a sealed housing at predetermined axially spaced locations on a spindle, an embodiment is disclosed in which a set of baffle plates is supported by a backplate and mounted such that each baffle lies in the same plane as its adjacent disk. Each baffle plate has the same thickness as that of its respective adjacent disk. The backplate aids in reducing airflow across the arm therefore further reducing turbulence. Mounted between baffle plates in a position upstream at the headslider suspension assembly are air deflectors to help direct the air flow to minimize turbulence at the disk edge. The air deflectors may be integrally formed with the backplate and baffle plates.

BRIEF DESCRIPTION OF THE DRAWINGS

FIG. 2 is a simplified and greatly exaggerated geometric representation of a positioning arm and angled suspension arm showing the off-track error produced by vibratory motion of the positioning arm.

DETAILED DESCRIPTION

Figure 1:
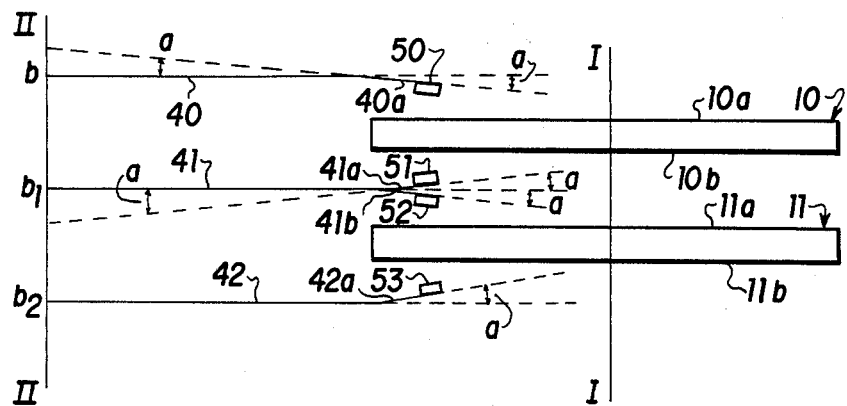
FIG. 1 is a schematic representation showing a side elevational view of multiple disks cooperating with positioning arm head slider assemblies.
Figure 1A:
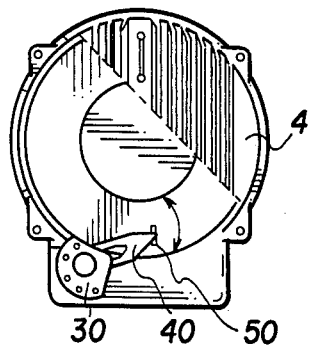
FIG. 1A is a partial cut-away plan view of a sealed disk housing in which the disk, actuator, positioning arm and suspension head assembly are visible.
Figure 4:
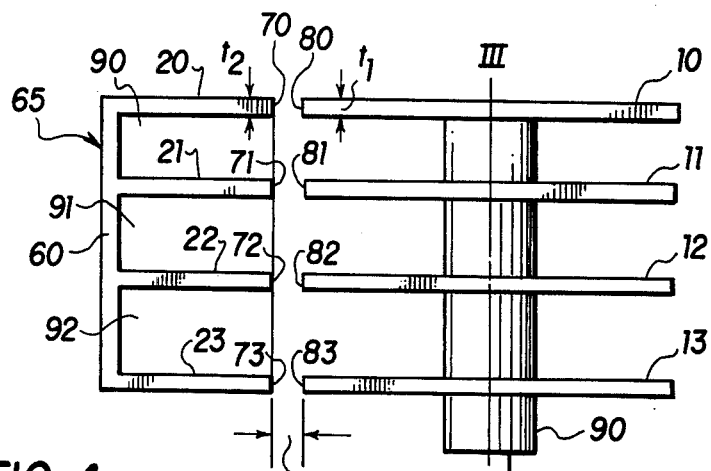
FIG. 4 is a side elevational view of the baffle assembly of the invention showing a series of parallel baffle plates and their respective adjacent disks.
Figure 3:
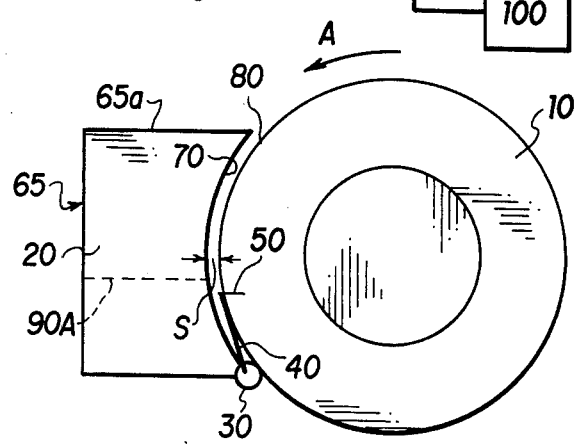
FIG. 3 is a schematic plan view of a baffle assembly and its adjacent disk constructed according to the invention.
Figure 5:
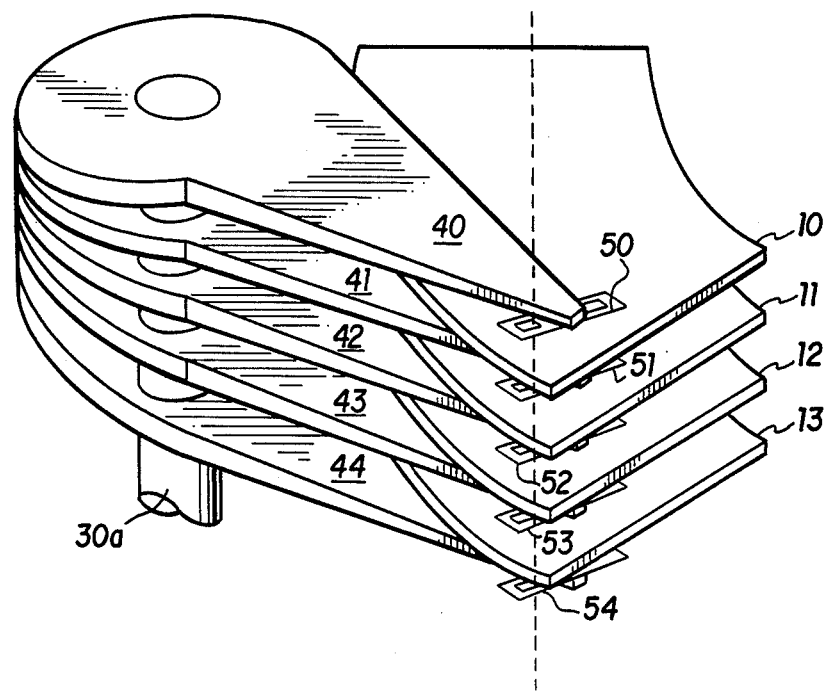
FIG. 5 is a perspective view of a multiple disk and positioning arm, actuator assembly that may be used with the baffle assembly of the invention.
Figure 6:
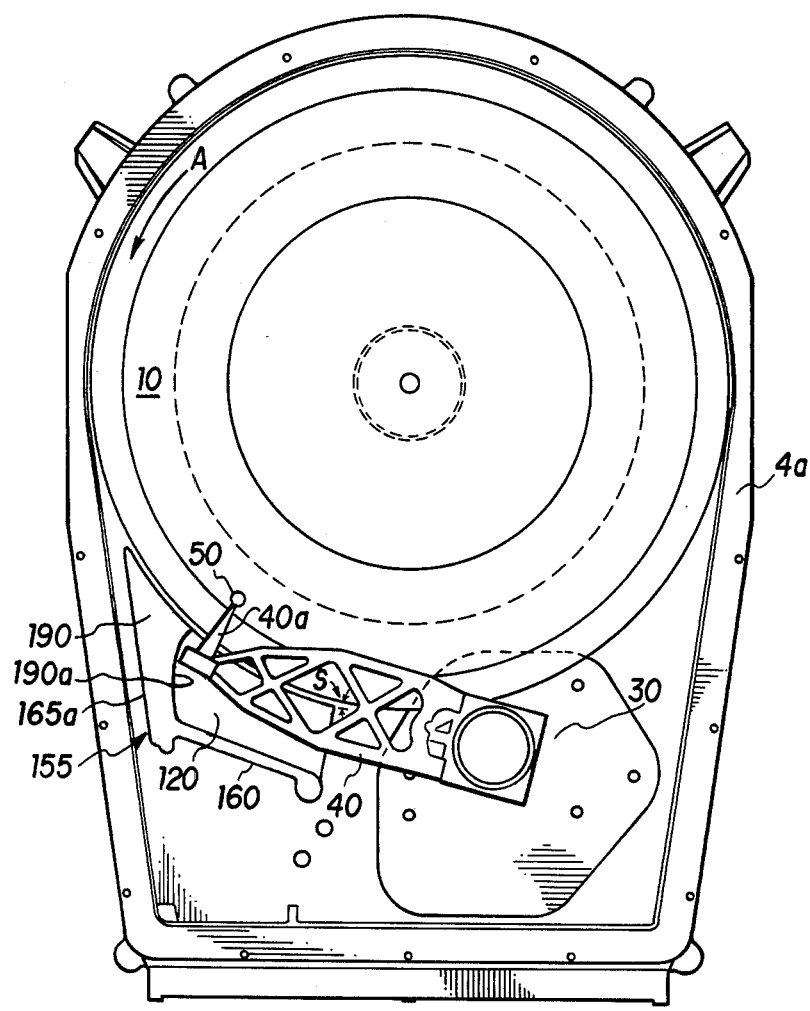
FIG. 6 is a plan view showing a baffle assembly and an actuator assembly in position within a sealed housing.

The baffle assembly of the present invention is depicted in FIGS. 3, 4, and 6. FIG. 3 is a plan view showing a magnetic disk 10, baffle 20, rotary actuator 30, positioning arm 40 and aerodynamically operable head slider suspension arm assembly 50 (shown in schematic representation). There may be more than one transducer head mounted upon slider assembly 50. The head slider assembly 50 includes a small suspension arm mounted in a plane which intersects the horizontally mounted positioning arm at a small angle as shown in FIG. 1. The length of the suspension arm is typically 1 inch and the suspension angle is typically 2°. The positioning arm 40 may be mounted on the actuator 30 at a point above or below the disk such as shown in FIG. 1 and FIG. 5. The baffle 20 has an inner edge 70 spaced from the circumferential edge 80 of disk 10 by a distance s as shown in FIGS. 3 and 4. Edge 70 is in the form of an arc conforming to the circumferential edge 80 of disk 10 so as to maintain a constant clearance gap s. A suitable distance for clearance gap s is 0.050 inches. This will ensure that air flows parallel to the disk as it passes over the circumferential edge of the disk, the clearance gap and the baffle. The flow will remain relatively laminar rather than becoming turbulent as it flows past the disk edge because the air sees the effect of a continuous flat surface rather than open space. This prevents significant vibration of positioning arm 40 which results in the previously mentioned horizontal or cross track motion sought to be eliminated for accurate positioning.

Rotary actuator 30 is positioned adjacent the baffle assembly 65 and is operable in a manner well known in the art to position the slider assembly 50 over a predetermined sector of one of a plurality of concentric disk tracks.

FIG. 4 shows an end elevational view of baffle assembly 65 comprising a series of parallel baffle plates 20, 21, 22 and 23 which are coplanar and adjacent to respective disks 10, 11, 12 and 13. The disks are mounted upon a spindle 90 having a longitudinal axis of rotation III—III. The spindle is rotated by a spindle motor schematically shown in FIG. 4 as 100.

Each of the disks 10, 11, 12, and 13 are mounted at predetermined axially spaced positions along the spindle in respective horizontal planes which are perpendicular to the longitudinal axis III—III of the spindle and parallel to each other. The disks are nonrotatably attached to the spindle such that rotation of the spindle causes simultaneous rotation of the disks 10-13. Baffle assembly 65 further comprises a backplate 60 supporting baffle plates 20, 21, 22, and 23. Each baffle plate has the same thickness as that of its adjacent disk, i.e., $t_1$ is equal to $t_2$ for each respective disk and baffle. Baffle 20 is mounted in the same horizontal plane as the horizontal plane in which disk 10 is mounted. Similarly, baffle 21 is mounted in the same horizontal plane as that in which disk 11 is mounted. The same holds true for baffle 22 and its respective disk 12 and baffle 23 and its respective disk 13. Thus, baffles 20, 21, 22 and 23 are parallel to each other and coplanar with their respective adjacent disks 10, 11, 12 and 13.

FIG. 5 shows the shaft 30a of a rotary actuator which may be used in conjunction with the baffle assembly 65. The actuator shaft 30a has positioning arms 40-44 mounted thereon in respective axially spaced planes which are parallel to the respective planes in which disks 10-13 are mounted for positioning respectively connected head slider suspension arm assemblies 50-54 over concentric tracks located on both sides of respective disks 10—13. The suspension assemblies 50-54 include angled suspension arms upon which the heads are mounted and more than one transducer head per suspension assembly may be provided. The suspension assemblies may comprise more than one suspension assembly connected to its respective positioning arm such as shown in FIG. 5 and FIG. 1 at 41a, 51 and 41b, 52. This arrangement permits the reading and writing of data and servo information on both sides of each disk 10-13.

By mounting each disk and its respective baffle plate in the same horizontal plane and by sizing equal thicknesses for the disks and its respective adjacent baffle plate, along with closely spacing edges 70, 71, 72 and 73 to the respective circumferential edge of each disk 80, 81, 82 and 83 to form a clearance gap s, air flowing at the edge of the disk sees the effect of a continuous flat surface and not open space. Thus, air flowing parallel to each disk surface continues to travel parallel as it leaves the disk and passes over its adjacent baffle. This ensures that the air flow is still relatively laminar rather than turbulent as it leaves the surface of the disk. The reduction of turbulence at the circumferential edge of the disk reduces the vibratory motion of the positioning arm holding the head slider suspension assembly. Reduction in vibratory motion of the arm reduces the horizontal or cross track motion of the head which produces off-track error sought to be minimized as previously discussed.

The disks 10-13, actuator 30, positioning arms 40-44 including their head suspension assemblies and baffle assembly 65 are all mounted within a sealed housing such as that shown at 4a in FIG. 6. In addition to supporting baffle plates 20-23, the backplate 60 reduces airflow across the arm thereby further reducing turbulence. Air deflectors 90, 91, 92 are provided between the baffle plates to help direct the air flow to minimize turbulence. As shown in FIGS. 3-4, the deflectors 90, 91, 92 are positioned upstream of the head slider suspension assemblies. Arrow A in FIG. 3 indicates that the direction of air flow within the housing is counterclockwise and air deflector 90 is positioned upstream of head suspension assembly 50 as shown by the dashed line 90A representing one end of deflector 90. Deflector 90 is positioned underneath baffle 20 and fills the entire space between baffles 20 and 21 from the end shown at 90A to the edge 65A of baffle assembly 65. Each of the deflectors 91, 92 are similarly mounted.

FIG. 6 shows a baffle assembly 165 in which the air deflector 190 is integrally formed with the backplate 160, both of which solidly extend in a direction perpendicular to the plane of the paper throughout the depth of assembly 165. The air deflector portion 190 extends from wall 165a to wall 190a in a direction parallel to the plane of the paper. Integrally formed or attached to baffle assembly 165 are a series of baffle plates (only one of which, i.e., plate 120, being shown in FIG. 6) mounted in planes which are adjacent to and coplanar with the respective disks in a manner similar to that shown in FIGS. 3-4 to form a small clearance gaps. Baffle assemblies 65, 165 reduce the off-track error caused by horizontal motion produced by the vibration of the positioning arm due to air turbulence such that accurate positioning of the head assembly over a sector of a disk track may be obtained.

What is claimed is:

1. A disk drive assembly comprising:
   (a) a spindle having a longitudinal axis;
   (b) means for rotating the spindle about its longitudinal axis;
   (c) a magnetic disk having an outer circumferential edge, said disk being mounted on said spindle at a predetermined axial position along said spindle to rotate therewith;
   (d) an aerodynamically operable slider assembly including at least one transducer head capable of reading and writing information of said disk;
   (e) means for positioning said slider assembly at various positions over concentric tracks located on said disk; and
   (f) a baffle plate mounted in a first plane perpendicular to the longitudinal axis of the spindle and the confines of said baffle plate being adjacent to said positioning means, said baffle having a thickness substantially equal to the thickness of said disk and an edge spaced closely to a fractional segment of the circumferential edge of said disk around said positioning means to form a clearance gap therebetween whereby air flow over said disk remains substantially laminar as it flows over said fractional segment of the outer circumferential edge around said positioning means to prevent vertical movement of said positioning means.

2. A disk drive assembly according to claim 1 wherein said disk is mounted in first plane perpendicular to the longitudinal axis of the spindle, said positioning means comprises a rotary actuator including a positioning arm and a suspension arm connected to said positioning arm, said positioning arm lies in a second plane parallel to said first plane and said suspension arm lies in a third plane which intersects said second plane, said slider assembly being mounted on said suspension arm.

3. A disk drive assembly according to claim 2 wherein said positioning means, said baffle plate and said disk are contained within a sealed housing.

4. A disk drive assembly according to claim 2 wherein said disk drive includes a plurality of magnetic disks each of which is mounted at a predetermined axially spaced location along said spindle in respective planes parallel to said first plane and a plurality of baffle plates, each of said baffle plates being mounted on a backplate in one of said respective planes in a position adjacent one of said disks and the comprises of each of said baffle plate being adjacent said positioning means, each baffle plate has a thickness substantially equal to the thickness of its adjacent disk and each baffle plate has an edge spaced closely to a fractional segment of the outer circumferential edge of its adjacent disks around said positioning means to form respective clearance gaps between each disk and its adjacent baffle plate whereby air flowing over each of said disks remains substantially laminar as it flows over said fractional segment of the outer circumferential disk edge around said positioning means to prevent vertical movement of said positioning means.

5. A disk drive assembly according to claim 1 wherein said clearance gap is approximately 0.050 inches.

6. A disk drive assembly according to claim 4 wherein each of said respective clearance gaps is approximately 0.050 inches.

7. A disk drive assembly according to claim 4 wherein said positioning means, said baffle plates and said disks are contained within a sealed housing.

8. A disk drive assembly according to claim 1 wherein said disk drive includes a plurality of magnetic disks each of which is mounted at a predetermined axially spaced location along said spindle in respective planes parallel to said first plane and a plurality of baffle plates, each of said baffle plates being mounted on a backplate in one of said respective planes in a position adjacent one of said disks and the confines of each of said baffle plates being adjacent said positioning means, each baffle plate has a thickness substantially equal to the thickness of its adjacent disk and each baffle plate has an edge spaced closed to a fractional segment of the outer circumferential edge of its adjacent disks around said positioning means to form respective clearance gaps between each disk and its adjacent baffle plate whereby air flowing over each of said disks remains substantially laminar as it flows over said fractional segment of the outer circumferential disk edge around said positioning means to prevent vertical movement of said positioning means.

9. A disk drive assembly according to claim 4 further comprising an air deflector mounted between said baffle plates to direct the air flow around said positioning arm whereby vertical movement of said positioning arm is minimized.

10. A disk drive assembly comprising:
(a) a spindle having a longitudinal axis;
(b) means for rotating the spindle about its longitudinal axis;
(c) a magnetic disk having a outer circumferential edge, said disk being mounted on said spindle at a predetermined axial position along said spindle to rotate therewith;
(d) an aerodynamically operable slider assembly mounted at an angle relative to said first plane and including at least one transducer head capable of reading and writing information on said disk;
(e) means for positioning said slider assembly at various positions over concentric tracks located on said disk; and
(f) a baffle plate mounted in a first plane perpendicular to the longitudinal axis of the spindle and the confines of said baffle plate being adjacent to said positioning means, said baffle having a thickness substantially equal to the thickness of said disk and an edge spaced closely to a functional segment of the outer circumferential edge of said disk around said positioning means to form a clearance gap therebetween whereby air flow over said disk remains substantially laminar as it flows over said fractional segment of the outer circumferential edge around said positioning means to prevent vertical movement of said positioning means.

11. A disk drive assembly comprising:
(a) a spindle having a longitudinal axis;
(b) means for rotating the spindle about its longitudinal axis;
(c) a plurality of magnetic disks each having an outer circumferential edge, said disks being mounted on said spindle at predetermined axially spaced positions along said spindle to rotate therewith;
(d) a plurality of aerodynamically operable slider assemblies each including at least one transducer head capable of reading and writing information on one of said disks;
(e) means for positioning said slider assemblies at various positions over concentric tracks located on said disk; and
(f) a plurality of baffle plates, each of said baffle plates being mounted on a backplate in one of said respective planes in a position adjacent one of said disks and the confines of each of said baffle plates being adjacent said positioning means, each baffle plate has a thickness substantially equal to the thickness of its adjacent disk and each baffle plate has an edge, spaced, closely to a fractional segment of the outer circumferential edge of its adjacent disks around said positioning means to form: respective clearance gaps between each disk and its adjacent baffle plate whereby air flowing over each of said disks remains substantially laminar as it flows over said fractional segment of the outer circumferential disk edge around said positioning means to prevent vertical movement of said positioning means.

* * * * *